US007736030B2

(12) United States Patent
Chen et al.

(10) Patent No.: US 7,736,030 B2
(45) Date of Patent: Jun. 15, 2010

(54) SOLID-STATE ILLUMINATION LAMP STRUCTURE

(75) Inventors: Wen-Ho Chen, Hsinchu (TW); Ming-Kang Chen, Miaoli County (TW); Mao-Ching Yang, Tao-Yuan (TW)

(73) Assignee: J.S. Technology Co., Ltd., Hsinchu (TW)

( * ) Notice: Subject to any disclaimer, the term of this patent is extended or adjusted under 35 U.S.C. 154(b) by 341 days.

(21) Appl. No.: 12/007,719

(22) Filed: Jan. 15, 2008

(65) Prior Publication Data

US 2008/0278079 A1 Nov. 13, 2008

(30) Foreign Application Priority Data

May 11, 2007 (TW) ............................. 96207669 U

(51) Int. Cl.
*B60Q 3/04* (2006.01)

(52) U.S. Cl. ....................... 362/362; 362/363; 362/351; 362/311; 362/800

(58) Field of Classification Search ................. 362/555, 362/559, 565, 582, 186, 202, 217, 310, 311, 362/351, 362, 363, 223, 222, 800
See application file for complete search history.

(56) References Cited

U.S. PATENT DOCUMENTS

| | | | | |
|---|---|---|---|---|
| 7,129,625 | B2 * | 10/2006 | Marsh | 313/17 |
| 7,334,918 | B2 * | 2/2008 | Newton et al. | 362/239 |
| 7,535,030 | B2 * | 5/2009 | Lin | 257/99 |

* cited by examiner

*Primary Examiner*—Tuyet Vo
(74) *Attorney, Agent, or Firm*—Rosenberg, Klein & Lee

(57) ABSTRACT

A solid-state illumination lamp structure includes a sleeve, a first electrode, a second electrode and a light-emitting assembly. The first electrode is mounted on one end of the sleeve and the second electrode is mounted on the other end of the sleeve. The light emitting assembly is mounted inside the sleeve and includes a circuit substrate, at least one light-emitting diode and two conducting assemblies. The two conducting assemblies are electrically connected to the first electrode and the second electrode, respectively, so that the light emitting assembly emits light.

11 Claims, 3 Drawing Sheets

SOLID-STATE ILLUMINATION LAMP STRUCTURE

BACKGROUND OF THE INVENTION

1. Field of the Invention

The present invention relates to lamp structures, and more especially to a solid-state illumination lamp structure.

2. Description of Related Art

Small conventional illumination lamps for desk or background lighting often use halogen lamps which emit light from tungsten filaments. However, tungsten filaments easily deteriorate under the effect of prolonged high temperature, so that halogen lamps need to be replaced frequently.

Additionally, halogen lamps produce much heat compared to the lighting output and therefore have high power consumption.

Thus, it is obvious that conventional lamp structures, still have some shortcomings and urgently need to be improved.

Hence, the inventors of the present invention believe that the shortcomings described above are able to be improved and finally suggest the present invention which is of a reasonable design and is an effective improvement based on deep research and thought.

SUMMARY OF THE INVENTION

An object of the present invention is to provide a solid-state illumination lamp structure which mainly replaces conventional halogen lamps with a light-emitting assembly which includes a circuit substrate, at least one light-emitting diode and two conducting assemblies to improve the shortcomings of conventional halogen lamps.

Another object of the present invention is to provide a solid-state illumination lamp structure which includes a sleeve with a partially opaque surface portion for designing a trademark pattern.

To achieve the above-mentioned objects, a solid-state illumination lamp structure in accordance with the present invention is provided. The solid-state illumination lamp structure includes a sleeve having a partially opaque surface portion and a transparent portion; a first electrode mounted on one end of the sleeve and having a first groove; a second electrode mounted on the other end of the sleeve and having a second groove; and a light-emitting assembly mounted in the sleeve, wherein the light-emitting assembly includes a circuit substrate mounted between the first groove and the second groove; at least one light-emitting diode mounted on the circuit substrate; and two conducting assemblies which are respectively mounted on two ends of the circuit substrate and electrically connected to the first electrode and the second electrode.

To further understand features and technical contents of the present invention, please refer to the following detailed description and drawings related the present invention. It is believed that the objects, features and points can be understood deeply. However, the drawings are only to be used as references and explanations, not to limit the present invention.

DETAILED DESCRIPTION OF THE PREFERRED EMBODIMENTS

Figure 1:
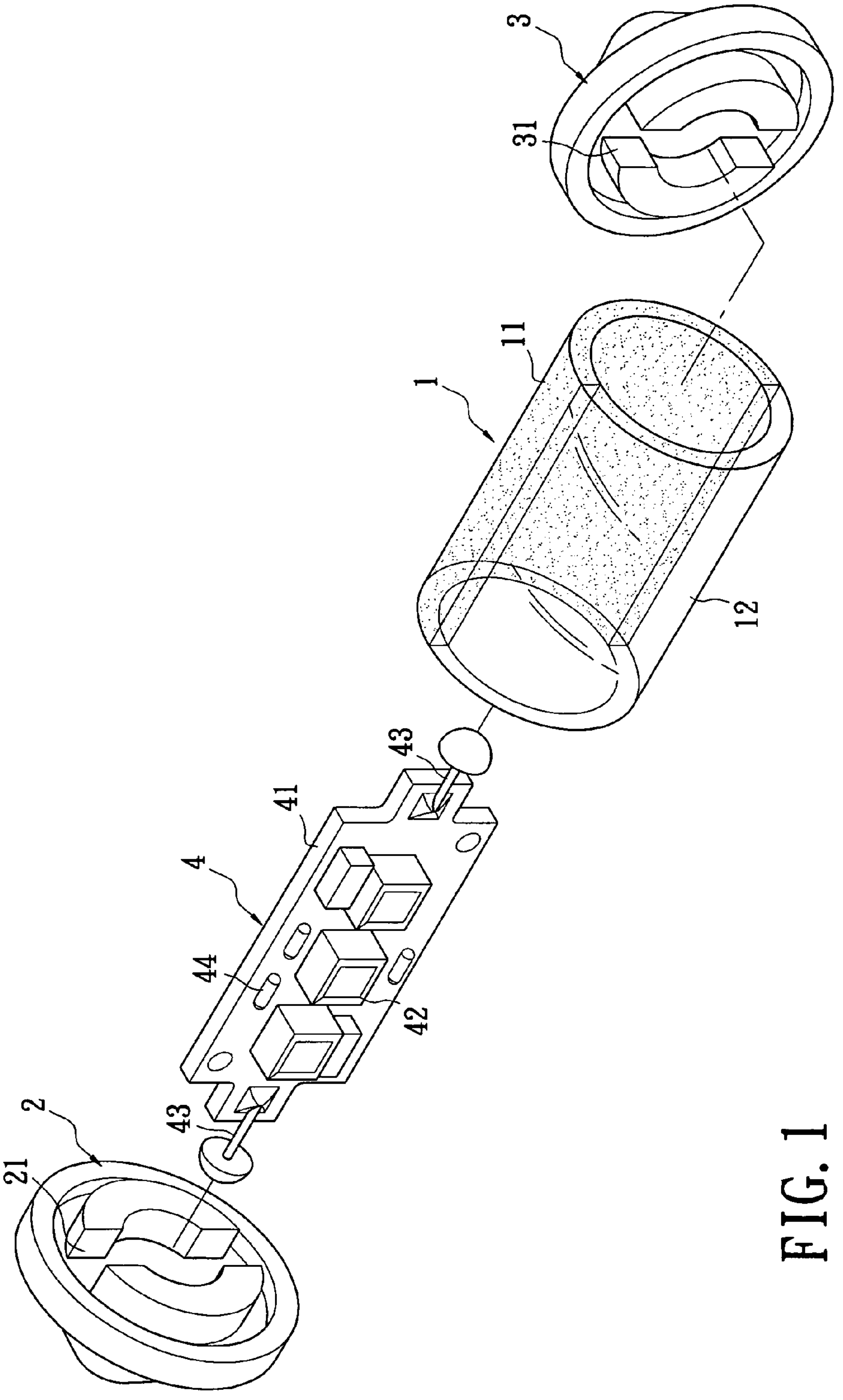
FIG. 1 is an exploded perspective view of a solid-state illumination lamp structure according to the present invention.
Figure 2:
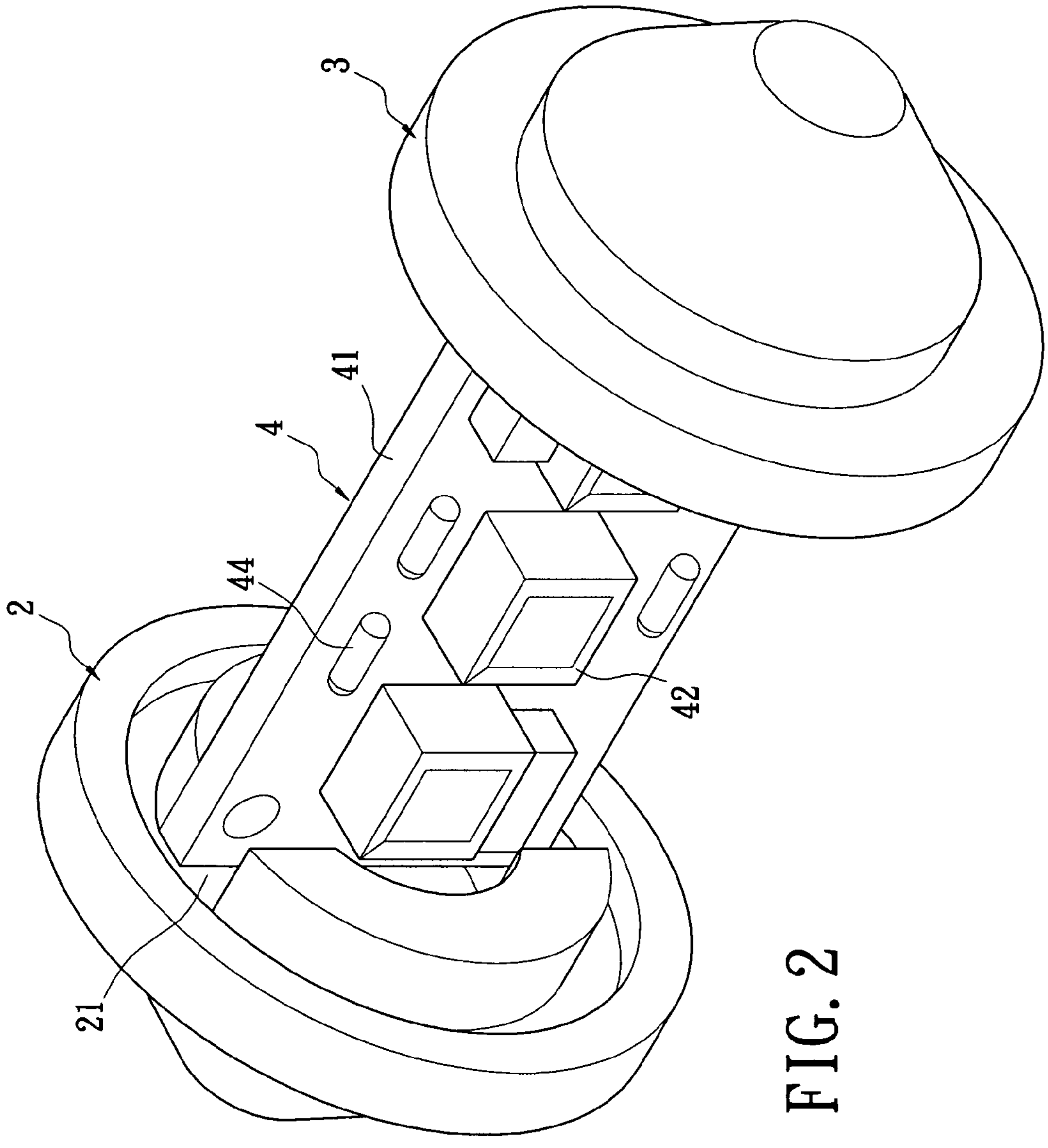
FIG. 2 is a partially assembled perspective view of the solid-state illumination lamp structure according to the present invention.
Figure 3:
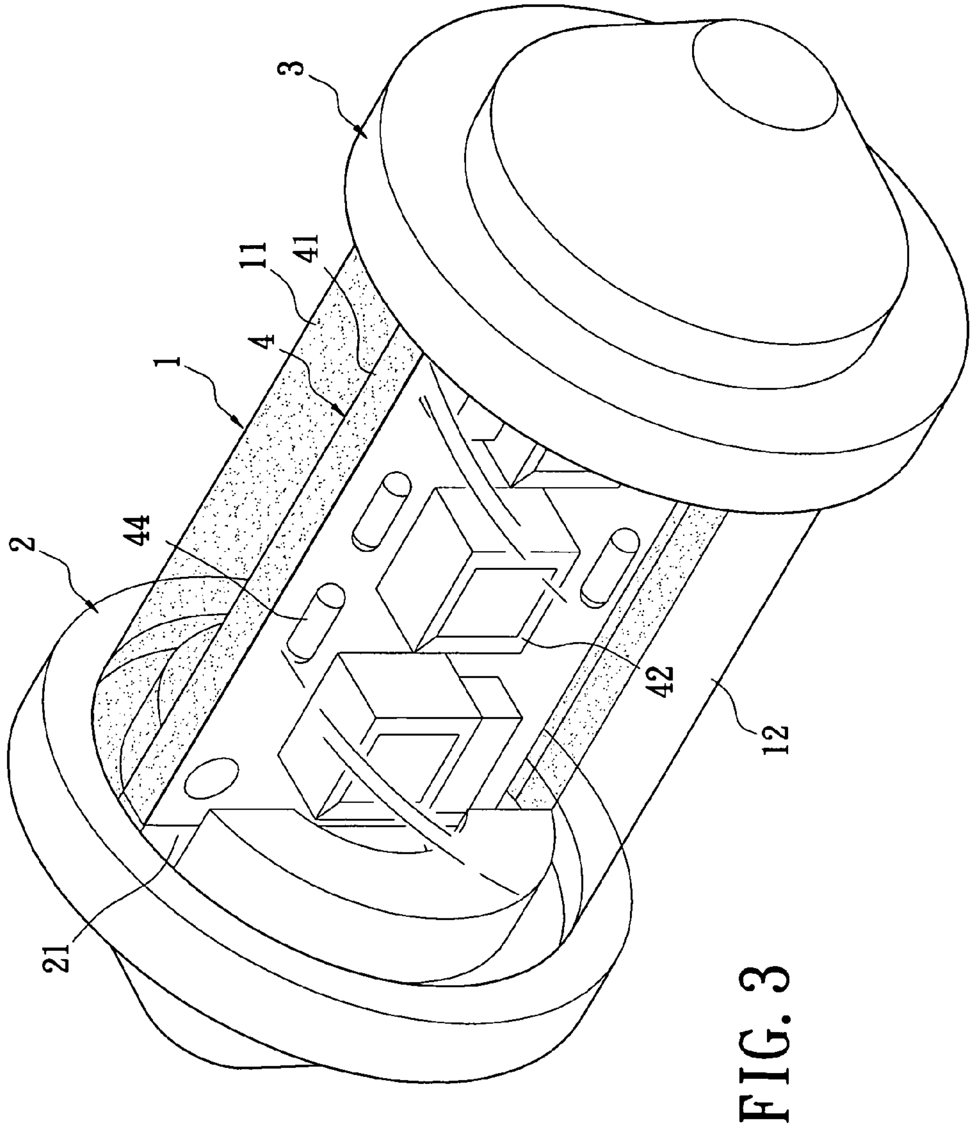
FIG. 3 is an assembled perspective view of the solid-state illumination lamp structure according to the present invention.

Please refer to FIGS. 1-3 illustrating a solid-state illumination lamp structure according to the present invention. The solid-state illumination lamp structure includes a sleeve 1, a first electrode 2, a second electrode 3 and a light-emitting assembly 4. The sleeve 1 has a partially opaque surface portion 11 which may be used for designing a trademark pattern (not shown), and a transparent portion 12. The sleeve 1 has a groove (not shown) for fixing the first and the second electrodes 2, 3. The sleeve 1 is made of plastic or acrylics.

The first electrode 2 is mounted on one end of the sleeve 1 and has a first groove 21. The second electrode 3 is mounted on the other end of the sleeve 1 and has a second groove 31. The first and the second electrodes 2, 3 are made of copper. Each of the first and the second electrodes 2, 3 has a protruding point (not shown) for fixing the sleeve 1. Further, the first and the second electrodes 2, 3 firmly cover the two ends of the sleeve 1, whereby the illumination lamp structure becomes waterproof and convenient to assemble. The first and the second electrodes 2, 3 may be used for rotational adjustment of the lamp. The first and the second electrodes 2, 3 are twin electrodes, that is, nonpolar and nondirectional electrodes. The outer ends of the first and the second electrodes 2, 3 have a flat surface.

The light-emitting assembly 4 is mounted in the sleeve 1 and includes a circuit substrate 41, one or more light-emitting diodes 42 and two conducting assemblies 43. The circuit substrate 41 is mounted between the first groove 21 and the second groove 31. The light-emitting diodes 42 are mounted on the circuit substrate 41. The two conducting assemblies 43 are respectively mounted on two ends of the circuit substrate 41 and electrically connected to the first electrode 2 and the second electrode 3, so that the light-emitting diodes 42 on the circuit substrate 41 emit light. The circuit substrate 41 further includes a current-limiting resistance 44 which limits the current to flowing through the light-emitting diode 42 so as to protect the light-emitting diodes 42 and increase their service life.

Consequently, the solid-state illumination lamp structure according to the present invention is advantageous that:

1. The light-emitting assembly 4 of the present invention replaces conventional halogen lamps with light-emitting diodes thereby increasing the service life of the illumination lamp structure;
2. The light-emitting assembly 4 of the present invention is small in size;
3. The sleeve 1 has a partially opaque surface portion 11 which may be used for designing a trademark pattern;
4. The first and the second electrodes 2, 3 are twin electrodes, that is, nonpolar and nondirectional electrodes;
5. The first and the second electrodes 2, 3 fixedly cover the two ends of the sleeve 1, thereby the illumination lamp structure has a waterproof function and is convenient for assembly.

What are disclosed above are only the specification and the drawings of the preferred embodiment of the present invention and it is therefore not intended that the present invention be limited to the particular embodiment disclosed. It will be understood by those skilled in the art that various equivalent changes may be made depending on the specification and the drawings of the present invention without departing from the scope of the present invention.

What is claimed is:

1. A solid-state illumination lamp structure, comprising:

a sleeve having a partially opaque surface portion and a transparent portion;

a first electrode mounted on one end of the sleeve and having a first groove;

a second electrode mounted on the other end of the sleeve and having a second groove; and a light-emitting assembly mounted inside the sleeve and including:

a circuit substrate mounted between the first groove and the second groove;

at least one light-emitting diode mounted on the circuit substrate; and two conducting assemblies respectively mounted on two ends of the circuit substrate and electrically connected to the first electrode and the second electrode.

2. The solid-state illumination lamp structure as claimed in claim 1, wherein the sleeve has a groove for fixing the first electrode and the second electrode.

3. The solid-state illumination lamp structure as claimed in claim 1, wherein the partially opaque surface portion of the sleeve is used for designing a trademark pattern.

4. The solid-state illumination lamp structure as claimed in claim 1, wherein the sleeve is made of plastic.

5. The solid-state illumination lamp structure as claimed in claim 1, wherein the sleeve is made of acrylics.

6. The solid-state illumination lamp structure as claimed in claim 1, wherein the first electrode and the second electrode are made of copper.

7. The solid-state illumination lamp structure as claimed in claim 1, wherein each of the first electrode and the second electrode has a protruding point for fixing the sleeve.

8. The solid-state illumination lamp structure as claimed in claim 1, wherein the first electrode and the second electrode firmly cover the two ends of the sleeve.

9. The solid-state illumination lamp structure as claimed in claim 1, wherein the first electrode and the second electrode are used for rotational adjustment of the lamp.

10. The solid-state illumination lamp structure as claimed in claim 1, wherein the outer ends of the first electrode and the second electrode have a flat surface.

11. The solid-state illumination lamp structure as claimed in claim 1, wherein the circuit substrate further includes at least one current-limiting resistance.

* * * * *